July 22, 1947.　　　C. J. TONKIN　　　2,424,520
SOIL IMPROVING METHOD
Filed Oct. 2, 1943
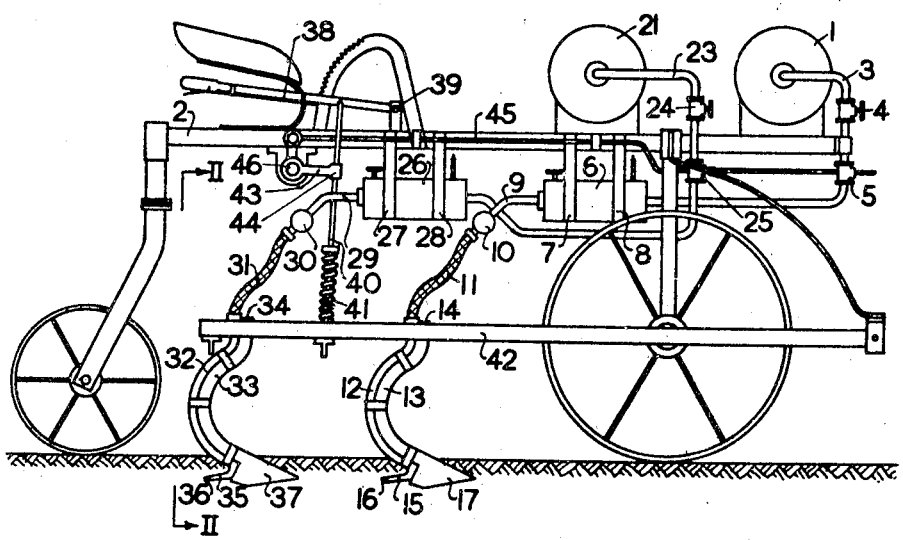
Fig. I
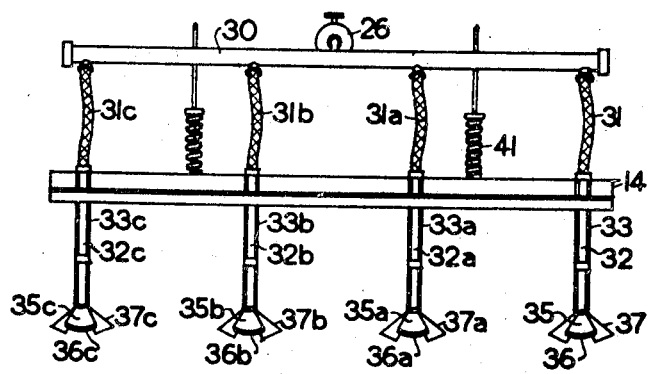
Fig. II
Inventor: Charles J. Tonkin
By his Attorney:

UNITED STATES PATENT OFFICE 2,424,520

SOIL IMPROVING METHOD

Charles J. Tonkin, Oakland, Calif., assignor to Shell Development Company, San Francisco, Calif., a corporation of Delaware Application October 2, 1943, Serial No. 504,785

12 Claims. (Cl. 47—58)

The present invention relates to soil treating methods and pertains particularly to a method whereby soils infected with plant parasitic insects and other pests, are improved by a combination treatment with a soil fumigant and nitrogen-containing fertilizer.

Soil fumigating and disinfecting agents heretofore proposed are not satisfactory and not widely used for various reasons, including phytocidal action on growing plants, localized action due to insufficient spreading and penetrating properties, expensiveness, etc. A particularly troublesome soil pest is the Nematode or eelworm, which is widely distributed in soils throughout the world. Its many species attack almost all plants and trees including most food crops. For example, one species, *Heterodera marioni*, which is distributed throughout the temperate, subtropical and tropical regions of the world, attacks more than eight hundred plants. The attacks by Nematodes weaken the plants and cause them to become diseased. A troublesome factor with Nematodes is that due to their microscopic size it is difficult to ascertain whether a plot of ground is infected thereby. About the only practical method of determining whether a ground plot is infected or not is to plant a crop and then after the plants have sufficiently developed to inspect the plants for Nematode attack as indicated by the formation of galls, general weakened condition, etc. However, by the time the effect of Nematode attack on plants is observable, the plants, even if freed from the Nematodes, are so weakened that it is the general practice to pull up the crop. This results in a considerable time loss in the use of the ground for economic production.

It is therefore an object of this invention to provide a soil improving method which avoids some of the above disadvantages, whereby a normal crop may be planted and, when an attack by Nematodes or like soil pests is evident, the soil is treated in such a manner that both the Nematodes or the like are eradicated or at least reduced to neglible numbers without further injury to the plants and at the same time the plants are stimulated in order to neutralize at least partially the adverse effect of the Nematode attack. This improved soil treating method permits the planting of a normal crop at the usual time without the full time loss incurred by discovery of attack by Nematodes or the like, pulling the infected plants, fumigating and replanting a new crop.

The accompanying drawings illustrate apparatus which may be used in carrying out the present method.

Figure I illustrates a side elevation of a conventional cultivator modified for the purposes of the present invention.

Figure II is a partial sectional view taken along the line II—II of Figure I.

The method of the present invention, whereby the above and other advantages are obtained, comprises applying approximately simultaneously to the soil a soil fumigant, which is preferably relatively non-phytocidal, and a liquid fertilizer, preferably of a quickly-assimilable nature, and especially of high nitrogen content.

Although many soil fumigating agents may be used to some advantage in the present process, it is preferred to use halogenated, especially polyhalogenated, unsaturated lower hydrocarbons, particularly those of 3 to 6 carbon atoms. A highly effective group of agents are the allyl-vinyl type polyhalo, preferably dihalo, unsaturated hydrocarbons of 3 to 6 carbon atoms, particularly those of 3 carbon atoms. In this class, it is preferable that one of the halo groups be on a terminal carbon atom. An especially effective compound of this class is 1,3-dichloropropene-1. A highly useful mixture containing 55% to 75% of this compound along with 15% to 40% of 1,2-dichloropropane and 0% to 20% of higher boiling materials consisting mainly of trichloro- and tetra-chloropropane may be obtained as a by-product from the high temperature chlor-substitution of propylene in the manufacture of allyl chloride under certain conditions. Other preferred agents include 1,1-dihalopropene-2 and the 2-alkyl homologues thereof, wherein the alkyl substituent has 1 to 3 carbon atoms, e. g. 1,1-dichloropropane-2, 1,1-dichloro-2-methylpropene-2, etc., and diallyl-type polyhalo, preferably dihalo, unsaturated hydrocarbons of 4 carbon atoms which have the halo groups on different carbon atoms, e. g. 1,4-dichlorobutene-2 and 1-chloro-2-chloromethyl propene-2. Generally most effective are the compounds or mixtures thereof which have a boiling range of 75° C. to 150° C. It is usually preferable to add small amounts of stabilizers to such polyhalogenated unsaturated lower hydrocarbons. Suitable stabilizers include hydrochloride-acceptors and the like, such as, for example, epichlorhydrin, propylene oxide, ethylene oxide, methyl vinyl ketone, acrolein, amyl amine, dimethyl amine, ammonia, ethanol amine, dihydroisophoronyl amine, glycerol, lime water, etc.

While advantageous results will be obtained by using many different fertilizers, such as ammonium sulfate, sodium nitrate, phosphoric acid, etc. in the method of the present invention, the most efficient and striking results are obtained by using anhydrous ammonia. It is believed that at least part of the superior effectiveness of the combination injection of ammonia and halogenated lower hydrocarbons resides in the multiple action of the ammonia. While ammonia is not an efficient Nematocide or soil disinfectant in itself, it is believed to contribute some insecticidal activities or increase the activity of other soil fumigants, but more important it is believed to act as an attractant for the Nematode larvae, and possibly as an agent stimulating the hatching and emergence of the larvae from the egg-containing cysts or galls. This stimulating action is particularly advantageous since the egg-containing cysts are usually quite resistant to penetration by toxic soil fumigants. Thus, it is believed that the multiple action of the ammonia causes the Nematode larvae to emerge from the difficultly-penetrable cysts, whereby they are exposed to the combined toxic action of the halogenated unsaturated lower hydrocarbons and ammonia, whereby less fumigant is needed to obtain the same results as is required when using the more efficacious soil fumigants alone. It is to be understood, however, that the above theory is offered merely as an attempt to explain the mechanism of the superior action of the combination injection of ammonia and halogenated lower hydrocarbons.

In the preferred embodiment of the present invention, a liquid relatively non-phytocidal soil fumigant, preferably a polyhalogenated unsaturated lower hydrocarbon, for example, the above-mentioned mixture containing 55% to 75% 1,3-dichloropropene-1 and 15% to 40% 1,2-dichloropropane, and liquid ammonia are simultaneously injected, preferably under positive pressure, in separate streams into the subsoil. The chloro-compounds and the ammonia may be injected into the ground through suitable tubes or pipes arranged behind cultivator shoes or the like. Both liquids may be injected into the soil behind each cultivator shoe through separate pipes or the pipes from the supply tanks of the two liquids may be arranged on an alternating pattern so that ammonia is introduced into the soil behind one cultivator shoe and the chloro-compounds as soil fumigants introduced into the soil behind the adjacent cultivator shoe.

Referring to the drawings, a suitable apparatus for carrying out the preferred embodiment of the present method comprises two separate and duplicate systems, one for the liquid ammonia and one for the liquid chloro-compounds. In the ammonia system, a cylinder 1 of liquefied anhydrous ammonia is mounted detachably upon the frame 2 of the cultivator. A conduit 3 leads from the ammonia cylinder through valves 4 and 5 to a flowmeter 6, also mounted upon frame 2 by means of brackets 7 and 8. A second conduit 9 leads from the flowmeter 6 to a manifold 10. From the manifold 10, a plurality of flexible conduits 11, 11a, 11b and 11c lead to arcuate metal conduits 12, 12a, 12b and 12c, fixedly mounted on the rear of tool-shanks 13, 13a, 13b and 13c, which are in turn mounted on a gang-bar 14. The metal conduits 12, 12a, 12b and 12c lead to fan-shaped nozzles 15, 15a, 15b and 15c having small outlet orifices therein at 16, 16a, 16b and 16c, mounted rigidly behind the cultivator shoes 17, 17a, 17b and 17c, which form the forward bank of ground-working tools.

In a similar manner, a cylinder 21 of liquid soil fumigating chloro-compounds is mounted detachably upon the frame 2 of the cultivator. A conduit 23 leads from the fumigant cylinder 21 through valves 24 and 25 to a flowmeter 26, also mounted upon frame 2 by means of brackets 27 and 28. A second conduit 29 leads from the flowmeter 26 to a manifold 30. A plurality of flexible conduits 31, 31a, 31b and 31c lead from the manifold 30 to arcuate metal conduits 32, 32a, 32b and 32c fixedly mounted on the rear of tool-shanks 33, 33a, 33b and 33c which are in turn mounted on a gang-bar 34. The metal conduits 32, 32a, 32b and 32c lead to fan-shaped nozzles 35, 35a, 35b and 35c having small outlet orifices 36, 36a, 36b and 36c mounted rigidly behind the cultivator shoes 37, 37a, 37b and 37c, which form the second bank of ground-working implements. When using the preferred chlorinated unsaturated lower hydrocarbons as soil fumigants, it is advisable to use parts which are not corroded thereby. For example, the flexible conduits 31, etc., may be formed of a polyvinyl chloride resin tubing.

The lifting lever arrangement for controlling the depth under the ground surface at which the cultivator shoes 17, etc., and 37, etc., travel, consisting of lever 38 pivoted at 39, link 40 attached to lever 38 and spring 41 attached to pendant 42, is further provided with automatic means for controlling the flow of ammonia and soil fumigant. An L-link 43 is pivotably attached to link 40 at 44 and similarly to a rod 45 which operates valves 5 and 25 in conduits 3 and 23, respectively. L-link 43 is in itself pivotably mounted at 46.

In operation valves 4 and 24 are first opened and lever 38 then pushed to the desired position and locked in place, this position being determined by the depth at which it is desired to introduce the ammonia and chloro-compounds. The downward movement of the lever 38 will also open valves 5 and 25 and permit fluid passage through conduits 3 and 23 to flowmeters 6 and 26, respectively. The flowmeters 6 and 26 are then adjusted to provide the desired rates of flow to manifolds 10 and 30 and thence to conduits 11, 12, 31, 32, etc., and nozzles 15, 35, etc. Any of the standard available flowmeters are satisfactory for the present purpose, as for example, the type described in U. S. Patent 2,038,511. When the end of the row is reached, or when for any other reason it is desired to stop the injection of soil improving agents, the cultivator shoes 17, 37, etc., are raised from beneath the soil surface, thereby closing valves 5 and 25 and shutting off the supply of ammonia and chloro-compounds by action of L-link 43, valve-operating rod 45, etc.

The depth beneath the ground surface at which the ammonia and chloro-compounds are introduced will depend upon several factors, as for example, the texture of the soil, the moisture content, etc. It may vary from two inches to eighteen inches or more. Under average conditions, a depth of approximately six inches will be satisfactory for both the ammonia and chloro-compounds, although one may be applied deeper than the other.

It will be readily apparent that various other arrangements of apparatus may likewise be used to carry out the method of the present invention. For example, similar apparatus may be attached to other agricultural equipment such as plows, seeders, bedders, etc., or two separate cultivator injectors similar to the above may be used in tandem, one injecting ammonia and the other injecting the halogenated unsaturated lower hydrocarbon.

The quantities of ammonia gas and chloro-compounds to be applied depend upon the general condition of the soil, the time of application, etc., and, in the case of ammonia, on the nature of the crop. For example, excellent results are obtained when 20 to 150 pounds of ammonia are applied per acre, the lesser amounts being used with grain crops and the heavier amounts being used with vegetables. When using the above-mentioned mixture containing 1,3-dichloropropene-1 and 1,2-dichloropropane as the fumigating agent, an application rate of 75 to 400 pounds per acre and preferably from 100 to 250 pounds is used. When using more active agents, such as 1,3-dichloropropene-1 in relatively pure form, lesser amounts such as 50 to 200 pounds per acre, of the fumigating agent are used.

The points of injection of the ammonia and halogenated hydrocarbons may be separated from each other by 10 to 25 inches or more. Where the agents are being injected between rows of plants by means of cultivator injectors as described above or the like, the ammonia may be injected into the soil in a path relatively close to the plants and the halogenated unsaturated lower hydrocarbons injected in a path at a further distance from the plants. On the other hand, it is sometimes desirous to inject both agents at the same point so that the attractive effect of the ammonia and the toxic effect of the halogenated hydrocarbons will be most efficiently utilized.

Another preferred method of applying the combination of ammonia or like quickly assimilatable fertilizer with soil fumigants comprises adding the agents to irrigation water. The ammonia is readily introduced into the irrigation by passing the ammonia gas from a cylinder conveniently positioned on the irrigation ditch bank through a tube or pipe containing a suitable metering device and depending into the water. The ammonia is introduced into the water preferably at a rate which yields a concentration of less than 300 parts per million and, in very hard water, less than 70 parts per million. The soil fumigants, such as the halogenated unsaturated lower hydrocarbons, are generally sufficiently soluble in water to allow the liquid hydrocarbons to be dripped into the water at a metered rate. It is sometimes desirous, however, to add the fumigants in aqueous emulsions.

Various other arrangements for introducing the two agents according to the present invention will be readily apparent to those skilled in the art. For example, when the soil fumigating agent and fertilizing or boosting agent are inert to each other, they may be mixed together in concentrated form, such as in solution in each other, a mutual solvent, etc., and injected into the soil as a mixture. The preferred agents of the present invention, ammonia and the halogenated lower hydrocarbons, should not, however, be mixed in concentrated form before introduction into the soil, although it may be practical with some of the slower-reacting hydrocarbons to form emulsions of the hydrocarbons in ammonia water, which emulsion may be introduced into the soil.

Any other suitable way of applying the agents according to the present invention may be used.

Thus, the ammonia or the like may be separately introduced into the soil by a cultivator injector as described above or the like, by means of irrigation water, etc., and the halogenated unsaturated lower hydrocarbons or other suitable soil fumigant introduced into the soil before or after the application of the ammonia within a reasonable period of time, preferably within one or two days or more, depending on soil and climatic conditions. In applying the soil fumigating agents, such as the halogenated unsaturated lower hydrocarbons, e. g. 1,3-dichloropropene-1 or mixtures containing the same, a simple but effective method comprises punching holes in the soil at frequent intervals, such as one foot, and pouring a measured amount of the agent into said holes. Hand or mechanically operated sub-surface injectors of any suitable type may likewise be used. The application may also be carried out by spraying the soil with an oil solution or an aqueous emulsion of the fumigating agents. On the other hand, the agents may be absorbed on inert carriers, such as talc, bentonite or other porous clays, or even the fertilizers if they are solids inert to the fumigating agents. The dust or powder may also be compacted into pellets, which may be made to disintegrate on contact with water, and the pellets dropped into a furrow behind a plow. Another method of application comprises dripping the liquid agents or emulsion thereof into a furrow directly behind a plow. It is quite often desirable to wet down the soil by irrigation or spraying with water after the completion of the combined injection of the soil fumigating agents and the ammonia or other quickly-assimilable nitrogen-containing or like fertilizing agent.

I claim as my invention:

1. A method of treating soil to improve its plant growing properties comprising introducing approximately simultaneously into said soil substantially below the surface thereof both a halogenated lower hydrocarbon soil fumigant and a quickly-assimilable nitrogen-containing plant food.

2. A method of treating soil to improve its plant growing properties comprising introducing approximately simultaneously into said soil substantially below the surface thereof both a soil fumigant comprising a ~~vinyl-allyl type~~ polyhalogenated unsaturated lower hydrocarbon and ammonia.

3. A method of treating soil to improve its plant growing properties comprising introducing approximately simultaneously into said soil substantially below the surface thereof both a mixture of unsaturated and saturated chlorinated hydrocarbons of 3 to 6 carbon atoms and a quickly assimilable ammonia-containing plant food.

4. A method of treating soil to improve its plant growing properties comprising introducing approximately simultaneously into said soil substantially below the surface thereof both a mixture of unsaturated and saturated halogenated hydrocarbons of 3 carbon atoms and a quickly-assimilable nitrogen-containing plant food.

5. A method of treating soil to improve its plant growing properties comprising introducing approximately simultaneously into said soil substantially below the surface thereof both ammonia and a chlorinated organic soil fumigant capable of controlling soil insects and bacteria.

6. A method of treating soil to improve its plant growing properties comprising irrigating said soil with water to which had been separately added both a halogenated lower hydrocarbon capable of controlling soil insects and bacteria and liquid ammonia.

7. A method of treating soil to improve its plant growing properties comprising applying to said soil a dilute emulsion of a halogenated unsaturated hydrocarbon in ammoniated water.

8. A method of treating soil to improve its plant growing properties comprising irrigating said soil with water while continually adding to said water a small proportion of an emulsion of a halogenated unsaturated lower hydrocarbon in ammoniated water.

9. A method of treating soil to improve its plant growing properties comprising introducing separately but approximately simultaneously into said soil substantially below the surface thereof both a soil fumigant chlorinated organic compound and ammonia.

10. A method of treating soil to stimulate plant growth therein comprising introducing approximately simultaneously into said soil substantially below the surface thereof both a halogenated organic soil fumigant containing reactive halogen atoms and a quickly-assimilable ammonia-containing plant food.

11. A method of treating soil to improve its plant growing properties comprising introducing approximately simultaneously into said soil a halogenated organic soil fumigant and a quickly-assimilable nitrogen-containing plant food.

12. A method of treating soil to improve its plant growing properties comprising introducing approximately simultaneously into said soil a chlorinated organic soil fumigant and a quickly-assimilable nitrogen-containing plant food.

CHARLES J. TONKIN.

REFERENCES CITED

The following references are of record in the file of this patent:

UNITED STATES PATENTS

| Number | Name | Date |
| --- | --- | --- |
| 261,558 | Lambert | July 25, 1882 |
| 824,791 | Jenkner | July 3, 1906 |
| 2,285,932 | Leavitt | June 9, 1942 |

FOREIGN PATENTS

| Number | Country | Date |
| --- | --- | --- |
| 465,178 | Germany | Sept. 8, 1928 |

OTHER REFERENCES

Chemical Abstracts, vol. 36, page 608, published January 1942, "Soil Treatments with Volatile Liquids for Control of Nematodes."